L. V. LABELLE.
WEIGHT RECORDING APPARATUS.
APPLICATION FILED OCT. 21, 1907.

989,785.

Patented Apr. 18, 1911.
2 SHEETS—SHEET 1.

WITNESSES

INVENTOR
LOUIS V. LABELLE

L. V. LABELLE.
WEIGHT RECORDING APPARATUS.
APPLICATION FILED OCT. 21, 1907.

989,785.  Patented Apr. 18, 1911.

2 SHEETS—SHEET 2.

WITNESSES

INVENTOR
Louis V. LABELLE.

UNITED STATES PATENT OFFICE.

LOUIS V. LABELLE, OF JOLIETTE, QUEBEC, CANADA.

WEIGHT-RECORDING APPARATUS.

989,785.

Specification of Letters Patent. Patented Apr. 18, 1911.

Application filed October 21, 1907. Serial No. 398,393.

*To all whom it may concern:*

Be it known that I, LOUIS V. LABELLE, of the town of Joliette, in the Province of Quebec and Dominion of Canada, have invented certain new and useful Improvements in Weight-Recording Apparatus, and do hereby declare that the following is a full, clear, and exact description of the invention.

My invention relates to improvements in recording weighing scales and is designed as an improvement on my application Serial No. 294,074, filed Jan. 2nd, 1906. Its primary object is to provide a positive and easily actuated mechanism, connecting the poise on the scale beam with the recording and printing mechanism, which will accurately transmit the least movement of the poise to the recording mechanism.

Further subsidiary objects are, first; to provide a positive alining means for the printing disks, which holds the disks rigidly at the moment of printing; and second; to provide means for introducing a series of tickets into the printing mechanism, to receive a duplicate record of the weight recorded by the device, which tickets may be delivered to customers or patrons.

To accomplish these objects, I provide a poise engaging carriage slidably mounted on a track and engaging a spirally grooved rod revolubly mounted parallel to said track. The revolutions of the spirally grooved rod are transmitted to the recording mechanism through the medium of a set of bevel gears. Fixed to each disk of the recording mechanism, is a toothed wheel which is engaged on the downward movement of the printing plunger, by a pawl adapted to aline the disk and hold it rigidly at the moment of making an impression therefrom. The cards which are to be fed to the printing mechanism are contained in a hopper across the bottom of which is a thin plate adapted to be moved by the downward movement of the plunger. The plate on entering the bottom of the hopper engages the edge of the lowest ticket and forces it out of the hopper through a suitable aperture. The retreat of the plate allows the pile of cards to drop to the floor of the hopper thus bringing another card in the path of the plate.

Figure 1:
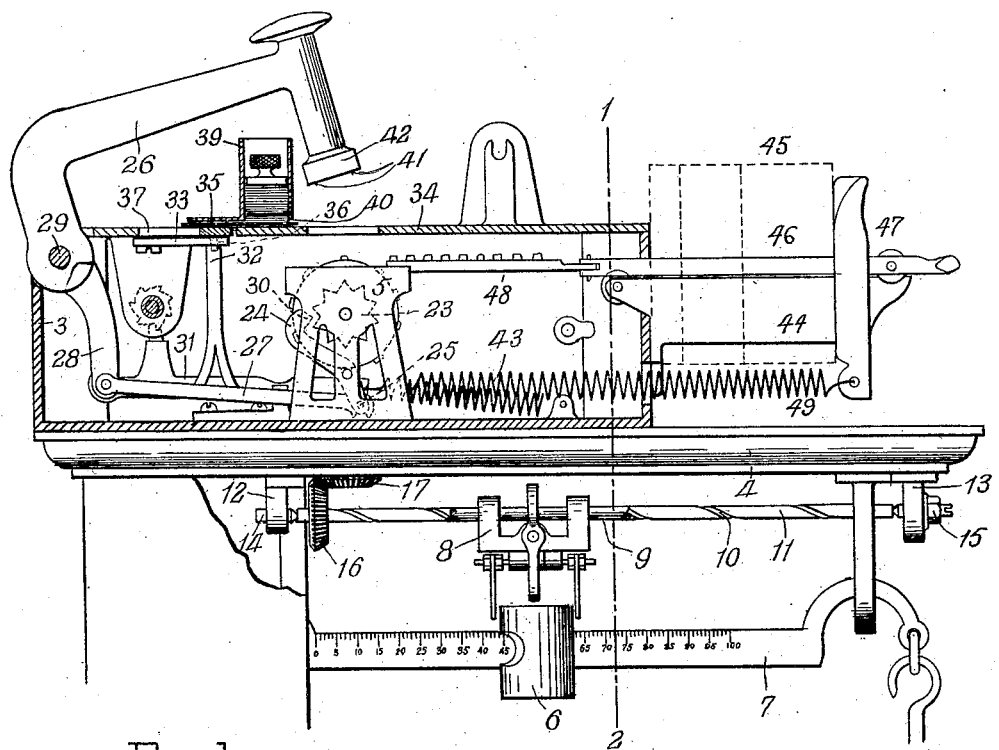
Figure 2:
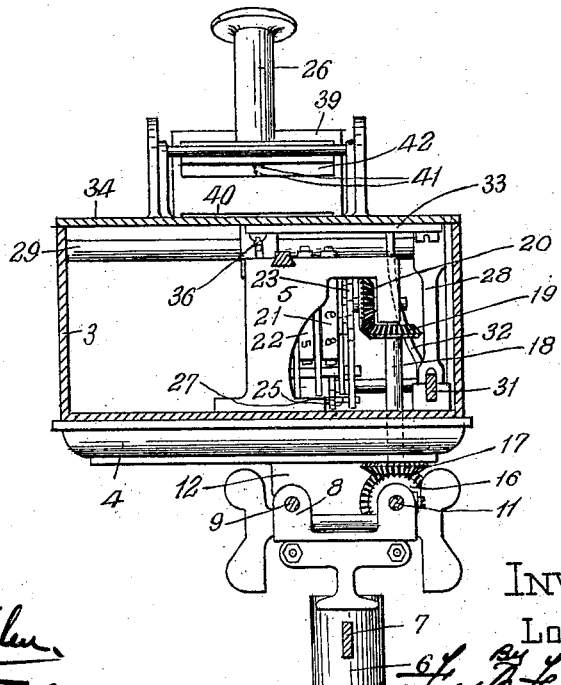
Figure 3:
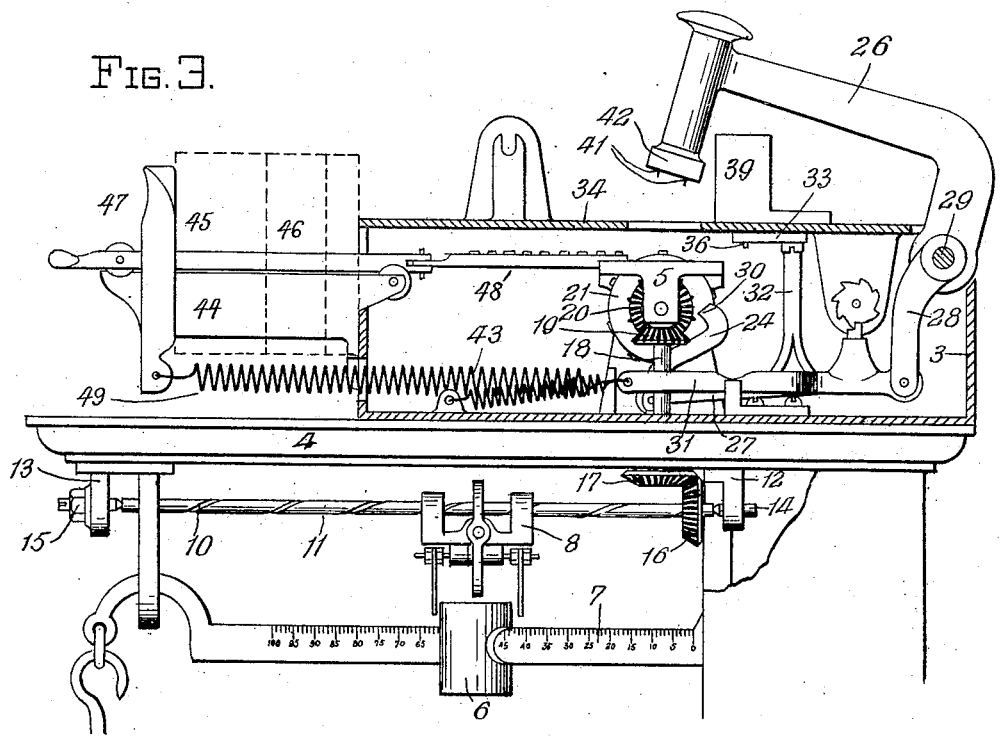
Figure 4:
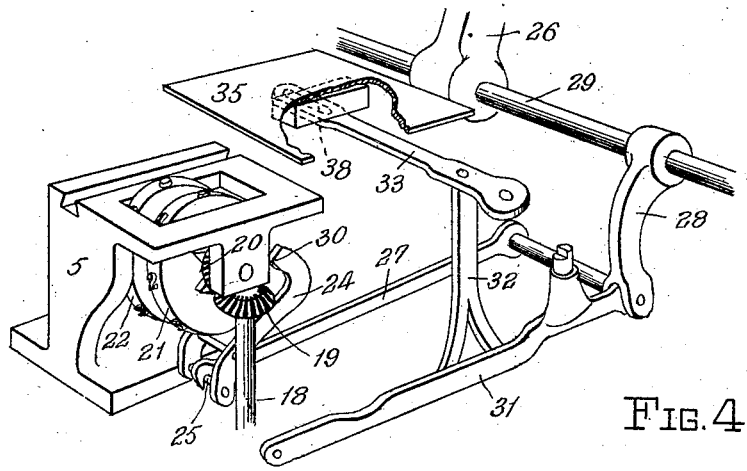

In the drawings which illustrate my invention:—Figure 1 is a side elevation of the device as viewed from the back of the scale. Fig. 2 is a vertical section through the mechanism on the line 1—2 of Fig. 1. Fig. 3 is a side elevation partly in section of the device seen from the front of the scale. Fig. 4 is a perspective view of a portion of the mechanism and shows more clearly the ticket feeding and the alining devices.

In the above defined figures, 3 designates a casing supported on the head 4 of a weighing scale. This casing 3 contains the printing mechanism 5 which is adjusted to correspond with the position of the poise 6 on the scale beam 7 by the movement of the carriage 8 through the mechanism hereinafter described. The carriage 8, which is identical with that described in my former application, is slidably mounted on a rod or track 9, supported by the brackets 12 and 13, and engages the groove 10 spirally cut in the shaft 11, which is revolubly mounted between the centers 14 and 15, respectively, supported by the brackets 12 and 13. A bevel gear 16 is fixed to the shaft 11 near one extremity thereof and meshes with a second bevel gear 17 fixed to a vertical shaft 18, which communicates the motion of the revoluble shaft 11 to the weight registering mechanism through the medium of the bevel gears 19 and 20. These bevel gears 16, 17 and 19, 20, are in such relation to one another that the units disk 21 of the weight registering mechanism 5 will make one complete revolution for every ten pounds indicated by the movement of the poise on the scale beam. Fixed to the recording disks 21 and 22 of the weight registering mechanism 5, are ten-toothed star wheels 23 which are each adapted to be engaged by a pivoted pawl 24, on each downward movement of the printing plunger 26, to aline the disks and prevent movement of the same at the moment of printing a record therefrom. These pawls 24, which are connected by a bar 25 so as to move in unison, are actuated by a rod 27, pivoted to the lower extremity of the lever 28 which is fixed to the supporting shaft 29 of the plunger 26, engaging the connecting bar 25.

It will be readily seen from the drawings that if the disks are out of alinement the extremities 30 of the pawls 24 will not fit accurately between the teeth of the star wheels 23 and will shift the same until the spaces between the teeth are centrally opposite the extremities 30 of the pawls, when they will enter and lock the star wheels and disks as long as the plunger remains depressed. A second rod 31 is also pivoted to the extremity of the lever or crank 28 and extends approximately parallel with the rod 27. This rod carries a rigidly attached vertical arm 32 which engages a short horizontal lever 33 pivoted to the under side of the cover 34 of the casing 3. The lever 33 actuates a thin sliding plate 35 on the upper side of the cover by means of a pin 36 which projects through a slot 37 in the cover and engages a slot 38 in the extremity of the cover, which latter slot allows for the radial motion of the lever 33. The plate 35 is adapted to force the lowest of a series of cards or tickets contained in a hopper 39 out through a slot 40 in the bottom of said hopper, and over the printing mechanism 5. When the plunger 26 is depressed to print a record of weight indicated by the disks 21 and 22 on one of these tickets, a plurality of small pins 41, projecting from the head 42 of the plunger, penetrate the ticket and raise it from the disks on the upward movement of the plunger, thus obviating the necessity of manually removing each ticket from the machine as it is printed. A helical spring 43 provides the power necessary to raise the plunger and return each part of the device to its initial position at the finish of each stroke, with the exception of the disks 21 and 22 which are movable only through the carriage 8 and the mechanism connecting said carriage and the disks.

Projecting beyond the casing 3 at the opposite end thereof from the plunger, is a bracket 44 adapted to support additional weights 45. Reciprocably mounted on this bracket is a bar 46 connected toward one extremity to a follower plate 47 and at the opposite extremity with a numeral bearing bar 48 slidable into register with the recording disks 21 and 22. A spring 49 acts to draw the follower plate 47 toward the casing so that only the thickness of weights on the brackets will intervene.

The operation of the device consists in shifting the carriage 8 on the rod 9 until the poise has been adjusted to the correct position on the scale beam. The movement of the carriage 8 is transmitted through the shaft 11, gears 16, and 17, shaft 18, and gears 19 and 20, to the recording mechanism 5, the disks 21 and 22 of which are rotated so that the numerals on them combine to form a number corresponding with the number of pounds indicated by the position of the poise. When the plunger 26 is depressed to print a record of the weight registered by the disks, it actuates the pawls 24 by means of a rod 27 to engage the star wheels 23 fixed to the disks 21 and 22. If one of the disks is out of alinement, the pointed end 30 of the pawl 23 slides on the face of the tooth it engages and rotates the wheel until the pawl fits accurately between the teeth of the star wheel.

When the plunger is making an impression from the disks, the pawls 24 are holding the disks rigidly so that the impression does not become blurred or uneven as would be the case if the disks moved at the moment of printing. Immediately after the alinement of the disks, the plate 35 advances and forces the lowest card of the pile in the hopper 39 out through the slot 40 and over the disks to have the record of weight printed thereon. After forcing out the card, the plate retreats with the upward movement of the plunger allowing the pile of cards to fall to the bottom of the hopper. The reciprocation of the plate is accomplished by means of a pivoted lever 33 which engages an upright member 32 carried by the reciprocating rod 31 pivoted to the crank 28.

The operation of the reciprocable bar 46 in shifting the numeral bar 48 on the alteration of the weights on the bracket 44 in order to record such alteration, has been fully described in my former application referred to at the beginning of this specification.

It will be obvious from the foregoing description that I have provided a positive and easily actuated connection between the carriage 8 and the printing recording mechnism 5 which absolutely prevents the movement of one without a corresponding movement of the other. The alining device will assure a neat appearance in the printing ticket and an exact and legible record on the paper ribbon retained in the machine, and the ticket feeding mechanism a rapid and convenient method of supplying patrons with a memorandum of the weight.

Having thus described my invention, what I claim is:—

1. In a recording weighing scale, a scale beam, a poise mounted thereon, a poise adjusting mechanism, a weight registering means, a spirally grooved shaft connected to said poise adjusting mechanism, gears connecting the spirally grooved shaft and the weight registering means, a printing plunger coöperating with the weight registering means, and plunger actuated pawls for alining said weight registering means.

2. In a recording weighing scale, a track, a poise gripping carriage slidably mounted thereon, a spirally grooved revoluble shaft parallel with said track and in engagement with said carriage, a weight registering means, a series of bevel gears connecting said spirally grooved shaft to the weight registering means, a printing plunger coöperating with the weight registering means, and plunger actuated pawls for alining and locking said weight registering means.

3. In a recording weighing scale, a scale beam, a poise mounted thereon, a poise actuating mechanism, a weight registering means comprising a plurality of numeral bearing disks and actuating gears therefor, a spirally grooved shaft actuated by said poise actuating mechanism, a series of bevel gears connecting said spirally grooved shaft to the disk actuating gears of the weight registering means, a printing plunger coöperating with the weight registering means, and a plurality of plunger actuated pawls adapted to aline and lock the disks of the weight registering means.

4. In a recording weighing scale, a scale beam, a poise mounted thereon, a poise adjusting mechanism, a weight registering means, a spirally grooved shaft revoluble by said poise adjusting mechanism, gears connecting said weight registering means and grooved shaft, a printing plunger coöperating with the weight registering means, plunger actuated means for forcing a series of tickets singly over said weight registering means, and plunger actuated pawls for alining and locking said weight registering means.

5. In a recording weighing scale, a scale beam, a poise mounted thereon, a poise adjusting mechanism, a weight registering means comprising a series of printing disks and shifting gears therefor, a spirally grooved shaft revoluble by said poise adjusting mechanism, gears connecting said shaft to the shifting gears of the weight registering means, a printing plunger coöperating with the weight registering means, plunger actuated pawls for alining said weight registering means, means for forcing a series of tickets singly over said weight registering means, and means for removing said tickets from the printing mechanism.

6. In a recording weighing scale, a scale beam, a poise mounted thereon, a poise adjusting mechanism, a weight printing device, a plunger coöperating with said printing device, means for alining the characters of said printing device, plunger actuated means for forcing a series of tickets singly over said printing device, and means for removing said tickets.

7. In a device of the character described, a scale beam, a poise mounted thereon, a poise adjusting mechanism, a weight printing device, a spirally grooved shaft revoluble by said poise adjusting mechanism, gears connecting said shaft and weight printing device, a printing plunger coöperating with said weight printing device, plunger actuated pawls for alining and locking said weight printing device, a slidable plate for forcing a series of tickets singly over said weight printing device, means connecting said plate with the plunger, and means for removing said tickets from the printing device.

8. In a device of the character described, a track, a carriage slidably mounted thereon, a revoluble shaft engaging said carriage, a weight registering device, suitable gearing connecting said shaft with the weight registering device, a printing plunger coöperating with said weight registering device, means for alining and locking the weight registering device, and plunger actuated means for printing a series of tickets and for removing said tickets singly from the printing mechanism.

In witness whereof I have hereunto set my hand in the presence of two witnesses.

LOUIS V. LABELLE.

Witnesses:
STUART R. W. ALLEN,
C. W. TAYLOR.

---

Copies of this patent may be obtained for five cents each, by addressing the "Commissioner of Patents, Washington, D. C."